(12) United States Patent
Le Bigot et al.

(10) Patent No.: US 9,887,762 B2
(45) Date of Patent: Feb. 6, 2018

(54) DEVICE, SYSTEM AND METHOD TO ASSIST WITH AIRCRAFT MAINTENANCE

(71) Applicant: AIRBUS (S.A.S.), Blagnac (FR)

(72) Inventors: Philippe Le Bigot, Blagnac (FR); Samuel Grossiord, Montans (FR); Christophe Figueras, Leguevín (FR)

(73) Assignee: Airbus SAS, Blagnac (FR)

( * ) Notice: Subject to any disclaimer, the term of this patent is extended or adjusted under 35 U.S.C. 154(b) by 37 days.

(21) Appl. No.: 15/013,126

(22) Filed: Feb. 2, 2016

(65) Prior Publication Data

US 2016/0233948 A1    Aug. 11, 2016

(30) Foreign Application Priority Data

Feb. 6, 2015   (FR) ..................... 15 50966

(51) Int. Cl.
| | | |
|---|---|---|
| *G06F 7/00* | (2006.01) | |
| *H04B 7/185* | (2006.01) | |
| *G07C 5/08* | (2006.01) | |
| *G07C 5/00* | (2006.01) | |

(52) U.S. Cl.
CPC ......... *H04B 7/18506* (2013.01); *G07C 5/008* (2013.01); *G07C 5/0808* (2013.01); *G07C 5/006* (2013.01); *G07C 5/085* (2013.01)

(58) Field of Classification Search
CPC ...... G01C 21/34; G01C 21/00; G01C 21/367; G08G 1/005; G08G 1/096816
See application file for complete search history.

(56) References Cited

U.S. PATENT DOCUMENTS

| | | |
|---|---|---|
| 6,092,008 A | 7/2000 | Bateman |
| 2003/0135311 A1 | 7/2003 | Levine |
| 2004/0158367 A1* | 8/2004 | Basu ............... G07C 5/006 |
| | | 701/31.9 |
| 2005/0228559 A1 | 10/2005 | Bloch et al. |
| 2007/0250228 A1 | 10/2007 | Reddy et al. |

(Continued)

FOREIGN PATENT DOCUMENTS

WO    2012/148296    11/2012

OTHER PUBLICATIONS

Preliminary Search Report cited in FR 1550966, completed Oct. 2, 2015, eleven pages.

(Continued)

*Primary Examiner* — Ian Jen
(74) *Attorney, Agent, or Firm* — Nixon & Vanderhye P.C.

(57) ABSTRACT

In an aircraft having a central maintenance computer, an ACMS system and a communications unit allowing communications with a ground station, a maintenance aid device comprises a processing unit configured to: store a trigger condition dependent on at least one aircraft maintenance data item and/or at least one aircraft flight data item; acquire first data emanating from the central maintenance computer and/or second data emanating from the ACMS system; verify whether the trigger condition is met, on the basis of the first data and/or of the second data; and if the trigger condition is met, send the communications unit, a dataset comprising maintenance data emanating from the central maintenance computer and aircraft flight data emanating from the ACMS system.

23 Claims, 1 Drawing Sheet

(56) References Cited

U.S. PATENT DOCUMENTS

| | | | |
|---|---|---|---|
| 2008/0040152 A1* | 2/2008 | Vian | G05B 23/0221 |
| | | | 705/2 |
| 2009/0192659 A1 | 7/2009 | Beebe et al. | |
| 2010/0152924 A1* | 6/2010 | Pandit | G01C 23/00 |
| | | | 701/3 |
| 2013/0116884 A1* | 5/2013 | Thomson | G07C 5/0825 |
| | | | 701/32.8 |
| 2013/0176148 A1* | 7/2013 | Harrison | G07C 5/0808 |
| | | | 340/963 |
| 2014/0067199 A1* | 3/2014 | Jiao | B64C 1/1476 |
| | | | 701/34.4 |

OTHER PUBLICATIONS

Peng Zhang et al., "Applications of Decision Support System in Aviation Maintenance", www.intechopen.com, Dec. 31, 2011, 17 pages.

* cited by examiner

DEVICE, SYSTEM AND METHOD TO ASSIST WITH AIRCRAFT MAINTENANCE

RELATED APPLICATION

This application claims priority to French Patent Application No. 1550966 filed Feb. 6, 2015, the entirety of which is incorporated by reference.

BACKGROUND

The technology herein relates to the field of aircraft maintenance, and more particularly to the transmission of data between an aircraft and a ground station in order to facilitate aircraft maintenance operations.

Aircraft, particularly modern transport airplanes, generally comprise a Central Maintenance Computer, generally referred to as a CMC, or a Central Maintenance System (CMS). The central maintenance computer is connected to a set of further computers carried onboard an aircraft and relating to various systems of the aircraft, such as, flight control systems, systems for controlling and monitoring the engines, managing the fuel, etc. The central maintenance computer receives from the other onboard computers data relating to failures of the systems, generally by means of signals of the Built-In-Test-Equipment (BITE) type. The central maintenance computer thus centralizes a set of maintenance data relating to the status of various aircraft systems, particularly relating to potential failures of the systems. The maintenance data centralized by the central maintenance computer thus correspond to maintenance data coming from the various aforementioned systems, without there being any need for the central maintenance computer to interpret this maintenance data in order to discover the status of the systems.

During a flight of the aircraft, the central maintenance computer records the maintenance data relating to the aircraft systems and produces a maintenance report. The maintenance report comprises at least a significant proportion of the data relating to the status of the aircraft systems. The central maintenance computer records the maintenance report at the end of the flight (generally referred to as a post flight report). The post flight maintenance report is generally used by a maintenance operator to determine what maintenance operations to carry out on the aircraft. During the maintenance operations, the maintenance operator can also consult the current status of the aircraft systems, particularly potential failures thereof, via a screen interfaced with the central maintenance computer. During the flight of the aircraft, a subset of the maintenance report in the process of being recorded may also be sent to a ground station, for example a maintenance center of the airline operating the aircraft. The subset is generally sent by means of a communication of the ACARS (Aircraft Communications Addressing and Reporting System) type. The sending of the subset is performed cyclically, at a predetermined time interval that may be dependent on the model of aircraft, usually every 15 minutes. The data to be sent is limited to the subset of the maintenance report so as to limit the volume of data that has to be transmitted from the aircraft to the ground station, given the high cost of communications of the ACARS type. The subset corresponds to a predetermined selection of data from among the data recorded in the maintenance report. The subset will be referred to as a current maintenance report in the remainder of this description.

An aircraft also generally comprises an Aircraft Condition Monitoring System (ACMS). The ACMS system monitors the flight data of the aircraft. The aircraft flight data may correspond to data from sensors or other equipment of the aircraft, for example the current performance of the aircraft, aircraft speed data, data relating to the operation of the aircraft engines (temperature, etc.), etc. An ACMS system is configured to produce reports corresponding to a predetermined set of aircraft data. These reports are generally referred to as ACMS reports or Aircraft Integrated Data System (AIDS) reports. These reports may be defined by the constructor of the aircraft or by the airline operating the aircraft, by means of dedicated programming installed by an operator operating onboard the aircraft. The ACMS system may also be configured to send these reports to a ground station, generally by means of a communication of the ACARS type. In particular, these reports may be produced by the ACMS system and sent to the ground station when a condition regarding the predetermined set of aircraft data is satisfied, for example in the event of an anomaly with values of some of the data.

However, in the event of an aircraft system has a fault, such reports reveal only the consequences that the aircraft flight data has a fault, but do not always contain data that allows directly identifying the origin of the fault. On the basis of an ACMS report, a ground station operator may generally at most suspect a certain number of aircraft systems, but may not have any certainty as to which of these systems is actually faulty. In order to identify a faulty system, the operator generally consults the last current maintenance report(s) sent by the Central Maintenance Computer (CMC) to the ground station. However, as discussed previously, the current maintenance reports sent by the central maintenance computer contain only a subset of the data from the maintenance report. As a result, they may fail to contain the information that would have been useful for the operator in understanding the origin of a fault. In addition, given that the current maintenance reports sent by the central maintenance computer are sent cyclically, in particular every 15 minutes, the data contained in a current maintenance report sent by the central maintenance computer are not synchronized with the data contained in the report sent by the ACMS system. Because these various data correspond to different moments in time, it may be difficult for the operator to correlate them in order to identify the origin of a fault. In addition, as already discussed, the usual interval between two successive transmissions of current maintenance reports by the central maintenance computer to the ground station is relatively long, such as 15 minutes. As a result, the data contained in such a report may be obsolete by the time a report from the ACMS system is received by the ground station. In addition, even if the data contained in the next report allow identifying the origin of the fault, the fact that the maintenance operator has to wait for the next report may induce a significant delay into the analysis of the data by this maintenance operator.

SUMMARY

The technology herein provides a solution to the above mentioned problems. The technology herein relates to a device to assist with the maintenance of an aircraft, the device being carried onboard the aircraft, the aircraft comprising: a central maintenance computer; an ACMS system; and a communications unit configured to allow communications between the aircraft and a ground station.

The device may comprise:

a first interface configured to communicate with the central maintenance computer by means of a first communications link of the aircraft;

a second interface configured to communicate with the ACMS system by means of a second communications link of the aircraft;

a third interface configured to communicate with the communications unit by means of a third communications link of the aircraft; and a processing unit configured to:

(i) store a trigger condition dependent on at least one aircraft maintenance data item and/or at least one aircraft flight data item;

(ii) acquire first data emanating from the central maintenance computer, through the first interface and/or second data emanating from the ACMS system, through the second interface;

(iii) verify whether the trigger condition is met, on the basis of the first data and/or of the second data; and (iv) if the trigger condition is met, send the communications unit, through the third interface, a dataset comprising maintenance data emanating from the central maintenance computer and aircraft flight data emanating from the ACMS system.

Thus, the device allows monitoring the onset of a trigger condition relating to the data emanating from the central maintenance computer and/or to data emanating from the ACMS system. The trigger condition may notably correspond to the onset of a fault with a piece of equipment onboard the aircraft, requiring maintenance operator intervention. When the trigger condition is satisfied, the device sends a dataset to the communications unit, which transmits it to a ground station. A maintenance operator at a ground maintenance center can therefore become acquainted with the dataset as soon as possible after the triggering of the condition. In addition, the dataset comprises both maintenance data emanating from the central maintenance computer and aircraft flight data emanating from the ACMS system, these various data are synchronized because they are collected at substantially the same moment in time, following the triggering of the condition or upon the triggering of the condition. That allows the maintenance operator to correctly assess the status of the aircraft in order to understand the origin of any fault that may have already been identified, or even to prevent such a fault from occurring by identifying a drift in parameters.

According to one example embodiment, the processing unit is configured to send the dataset to the communications unit repeatedly. In particular, the processing unit is configured to repeat the sending of the dataset to the communications unit: a predetermined number of times; for a predetermined duration; or until the processing unit receives a stop command to stop the sending, the stop command coming from the communications unit through the third interface.

The fact that the dataset is sent repeatedly allows the maintenance operator to analyze how the various data evolve over time, and therefore gain a better assessment of the origin of any fault that may have already been identified, or even prevent a potential fault from occurring by identifying a drift in parameters.

Advantageously, the processing unit is configured to: when the trigger condition is not met, record the dataset in a memory of the device, repeatedly; and when the trigger condition is met, send at least some of the data recorded in the memory to the communications unit through the third interface.

This allows the dataset to be prerecorded repeatedly before the condition is triggered, and then allows the prerecorded data to be sent to the ground station following the triggering of the condition. The maintenance operator thus has data corresponding to moments prior to the triggering of the condition, and this may assist him in understanding when, and therefore where a fault occurred.

Advantageously also, the processing unit is configured to receive the trigger condition coming from the communications unit, through the third interface.

Thus an operator at a maintenance center can define a trigger condition for which he wishes to obtain the dataset, then send this trigger condition to the aircraft via a communications link between the ground station and the communications unit of the aircraft. Thus, the maintenance operator can easily set the trigger condition in the maintenance aid device without requiring the intervention of an operator onboard the aircraft. The setting of the trigger condition can therefore be performed easily and in a very short space of time, both for an isolated aircraft and for all the aircraft of an airline.

According to one example embodiment, the processing unit is configured to: receive a send command, coming from the communications unit, through the third interface; and upon receipt of a send command, send the dataset to the communications unit, through the third interface.

That allows an operator at a maintenance center to send a request to the aircraft in order to request for the transmission of the dataset to the ground station, independently of activation of the trigger condition.

The technology herein also relates to a system to assist with the maintenance of an aircraft, the system being carried onboard the aircraft, the aircraft comprising a communications unit configured to allow communications between the aircraft and a ground station.

The maintenance aid system is notable in that it comprises: a central maintenance computer; an ACMS system; and a device to assist with maintenance as aforementioned.

In one particular example embodiment, the central maintenance computer, the ACMS system and the maintenance aid device are incorporated into one and the same physical unit.

The technology herein also relates to an aircraft comprising a maintenance aid system as aforementioned.

The technology herein also relates to a method to assist with the maintenance of an aircraft comprising:

a central maintenance computer;

an ACMS system; and a communications unit configured to allow communications between the aircraft and a ground station.

The method is notable in that, with the aircraft further comprising a maintenance aid device comprising:

a first interface configured to communicate with the central maintenance computer by means of a first communications link of the aircraft;

a second interface configured to communicate with the ACMS system by means of a second communications link of the aircraft;

a third interface configured to communicate with the communications unit by means of a third communications link of the aircraft; and a processing unit, wherein the method comprises the following steps performed by the processing unit:

storing a trigger condition dependent on at least one aircraft maintenance data item and/or at least one aircraft flight data item;

acquiring first data emanating from the central maintenance computer, through the first interface and/or second data emanating from the ACMS system, through the second interface;

verifying whether the trigger condition is met, on the basis of the first data and/or of the second data; and if the trigger condition is met, sending the communications unit, through the third interface, a dataset comprising maintenance data emanating from the central maintenance computer and aircraft flight data emanating from the ACMS system.

SUMMARY OF FIGURES

These and further aspects of the exemplary implementations will be better understood from reading the following description and from studying the attached figures.

SUMMARY

Figure 1:
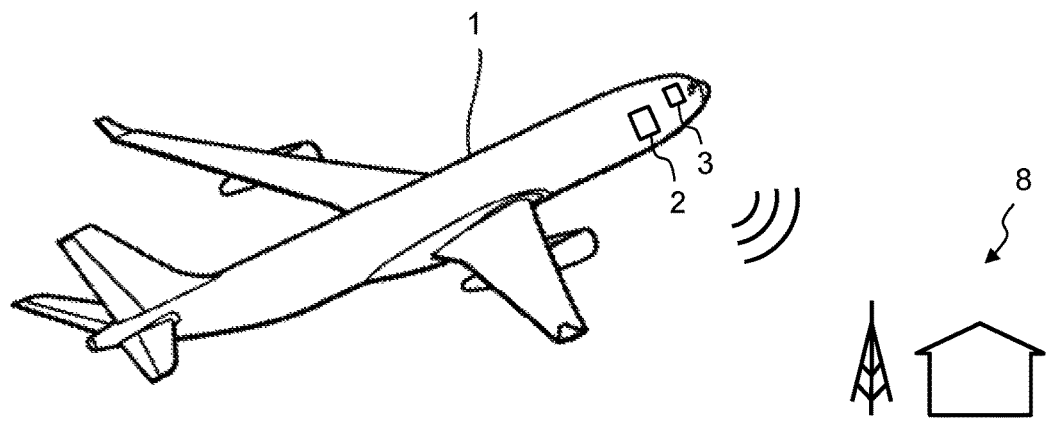
FIG. 1 in simplified fashion illustrates an aircraft comprising a maintenance aid system.
Figure 2:
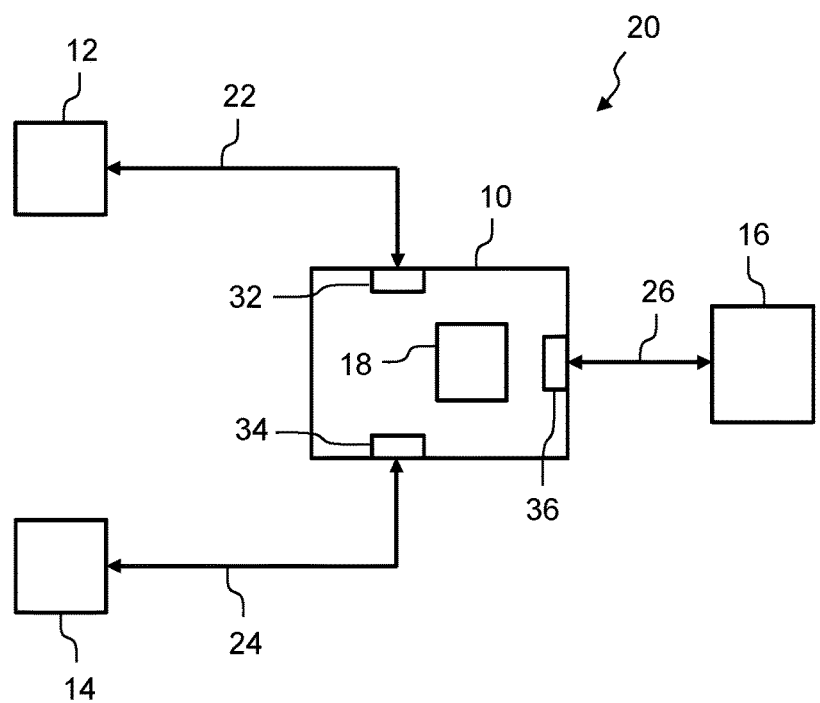
FIG. 2 schematically depicts a maintenance aid system according to one example embodiment.

The aircraft 1 depicted in FIG. 1 comprises a cockpit 3 and an avionics bay 2 accommodating an aircraft maintenance aid system. The maintenance aid system is intended to communicate with a ground station 8 by means of a wireless link. The ground station is connected to a computer (not depicted) of a maintenance operator. The computer may be situated in the ground station 8 or alternatively at a maintenance center remote from the ground station and connected thereto by a communications network, for example the internet or a dedicated network. In an example embodiment depicted in FIG. 2, the maintenance aid system 20 comprises a central maintenance computer 12, an ACMS system 14, a communications unit 16 and a maintenance aid device 10. The maintenance aid device 10 may notably be implemented in a computer carried onboard the aircraft. The maintenance aid device 10 may for example correspond to a dedicated computer or alternatively be housed in a computer of a modular avionics type (e.g., integrated modular avionics or IMA). The maintenance aid device 10 comprises a first communications interface 32 configured to communicate with the central maintenance computer 12 by means of a first communications link 22. It also comprises a second communications interface 34 configured to communicate with the ACMS system 14 by means of a second communications link 24, and a third communications interface 36 configured to communicate with the communications unit 16 by means of a third communications link 26. The communications unit 16 may notably correspond to an onboard computer or server for managing communications between the aircraft and the ground and configured to allow communications between the aircraft and the ground station 8 by means of one or more antennas of the aircraft. The communications management computer may notably support satellite communications over a network of WiFi® type, or even over a telecommunications network of 3G or 4G type, etc. In a preferred example embodiment, these communications may employ a protocol of the Internet Protocol (IP) type. In one example embodiment, the first interface 32, the second interface 34 and the third interface 36 correspond to communications ports of the maintenance aid device 10, these communications ports being, for example, compatible with the ARINC 429 standard. The first link 22, the second link 24 and the third link 26 therefore correspond to communications buses to the ARINC 429 standard. In another example embodiment, the maintenance aid device 10, the central maintenance computer 12, the ACMS system 14 and the communications unit 16 are connected to a deterministic full duplex Ethernet communications network, for example an AFDX® communications network. The first interface 32, the second interface 34 and the third interface 36 may therefore be implemented by means of the one same physical communications port of the maintenance aid device 10. The first link 22, the second link 24 and the third link 26 then correspond to virtual links of the communications network. The maintenance aid device 10 further comprises a processing unit 18. The processing unit may notably correspond to a processor or a microprocessor connected to one or more memories.

During operation, in a first step, a maintenance center operator sends a trigger condition to an aircraft, via the ground station 8. The trigger condition is dependent on at least one aircraft maintenance data item and/or at least one aircraft flight data item. The maintenance data item corresponds to data that can be supplied by the central maintenance computer and the flight data item corresponds to data that can be supplied by the ACMS system. In the aircraft, the trigger condition is received by the communications unit 16 which sends it to the maintenance aid device 10 by means of the link 26. The maintenance aid device 10 stores the trigger condition in a memory. Because the trigger condition is dependent on at least one aircraft maintenance data item and/or an aircraft flight data item, it may correspond either to a condition relating to one or more aircraft maintenance data items or to a condition relating to one or more aircraft flight data items, or alternatively, to a condition combining at least one aircraft maintenance data item and at least one aircraft flight data item. The maintenance operator can thus define, and send to the maintenance aid device, a trigger condition corresponding to any combination of aircraft maintenance and aircraft flight data. That allows him to define a trigger condition that is particularly well suited to monitoring a given fault likely to occur in the aircraft.

In particular, the trigger condition may correspond to a combination, using logic operators, of elementary conditions relating to aircraft maintenance and/or flight data. The logic operators may notably be AND, OR, NOT. The elementary conditions may correspond to comparison, using for example, comparison operators such as $<, >, =, \leq, \geq, \neq$, etc. The elementary conditions may also include arithmetic operators such as $+, -, \times, /$ linking numerical values. The elementary conditions may also include an operator of variation over time, so that the way in which the value of a parameter evolves over time can be monitored. An elementary condition containing an operator for variation over time may for example be: "a temperature drops by more than 10° C. in under 5 seconds." It is thus possible to define complex combinations of elementary conditions which may include conditions relating to how aircraft maintenance and/or flight data evolves.

One trigger condition may for example be as follows:

$$((temp1 > temp2 + 30) \text{ AND valve\_position}) \text{ OR } (calc\_fail)$$

in which temp1, temp2 and valve_position are aircraft flight data and calc_fail is aircraft maintenance data, particularly:

(i) temp1 and temp2 are two temperature values measured onboard the aircraft;

(ii) valve_position is logic data associated with a valve, the value of which is true when the valve is opened and false when the valve is closed; and (iii) calc_fail is logic data associated with a computer of the aircraft, the value of which is true when the computer is faulty.

Once the trigger condition has been stored by the maintenance aid device 10, the device monitors the potential occurrence of the trigger condition. To do so, the processing unit 18 repeatedly interrogates the central maintenance computer 12, via the first interface 32 and the link 22, to request first data and/or the ACMS system 14, through the second interface 34, and the link 24, to request second data. In return, the processing unit 18 receives first data emanating from the central maintenance computer 12, through the first interface 32 and/or second data emanating from the ACMS system 14, through the second interface 34. The first and/or second data requested by the processing unit 18 correspond at least to the aircraft maintenance data item and/or to the aircraft flight data item on which the trigger condition is dependent. In an example embodiment, these data items are limited to the data items necessary for evaluating the trigger condition. In another example embodiment, the data items correspond to a first aircraft maintenance dataset and to a second aircraft flight dataset, these two sets are independent of the trigger condition.

In an example embodiment, the processing unit 18 may also receive, automatically and repeatedly, the first data and/or the second data emanating from the central maintenance computer 12 and/or from the ACMS system 14. In the example embodiment, the central maintenance computer 12 and/or the ACMS system 14 are configured to send these data automatically and repeatedly to the processing unit 18, which then has no need to interrogate the computer and/or the system.

After having acquired the first and/or second data, the processing unit 18 verifies whether the trigger condition is satisfied, on the basis of the first and/or second data.

If the trigger condition is satisfied, the processing unit 18 sends the communications unit, through the third interface 36 and the link 26, a dataset containing maintenance data emanating from the central maintenance computer 12 and aircraft flight data emanating from the ACMS system 14. In a first alternative form, the dataset is independent of the trigger condition: when the trigger condition is satisfied, the same types of data are sent to the ground station whatever the trigger condition may be. In a second alternative form, the dataset is subject to settings: a maintenance operator can define the dataset he wishes to receive when the trigger condition is satisfied. The settings of the dataset are bundled with the trigger condition when the latter is sent from the maintenance center to the aircraft, and the settings are stored by the maintenance aid device, together with the trigger condition.

Advantageously, in the case of the aforementioned second alternative, the dataset containing maintenance data emanating from the central maintenance computer 12 and aircraft flight data emanating from the ACMS system 14 corresponds to all or part of the first aircraft maintenance dataset and of the second aircraft flight dataset. Thus, the data in the dataset are synchronized with the data used for evaluating the trigger condition.

Communications between the aircraft and the ground station can take place both during the aircraft flight and when the aircraft is on the ground, for example during a maintenance phase between two flights.

According to one example embodiment, from the moment at which the processing unit 18 detects that the trigger condition has been satisfied, it sends the dataset to the communications unit 16 repeatedly, at a determined frequency. For example, it sends the dataset every minute. That allows the maintenance operator to monitor how the various data items evolve over time, and this may assist him in determining the origin of a potential fault. In an example embodiment, the processing unit 18 sends the dataset repeatedly for a predetermined number of times or for a predetermined duration. Alternatively, in another example embodiment, the processing unit 18 sends the dataset repeatedly until it receives a stop command to stop sending data. The stop command originates from the communications unit 16 through the third interface 36. In such a case, when the processing unit 18 detects that the trigger condition has been satisfied, the maintenance operator receives the dataset repeatedly until he sends a stop command to the aircraft, the stop command is then transmitted to the processing unit 18 by the communications unit 16 as discussed above. Advantageously, the repeated sending of data is optimized by sending a subset of the dataset at a given moment, and the subset corresponds to the data items that are varied since the previous transmission. That makes it possible to limit the volume of data transmitted from the aircraft to the ground station.

In one advantageous example embodiment, when the processing unit 18 detects that the trigger condition has not been satisfied, it records the dataset in a memory. The recording of the dataset is performed repeatedly, at a determined frequency, for example every minute, as long as the trigger condition is not satisfied. If the processing unit detects that the trigger condition is satisfied, then it sends at least some of the data recorded in the memory to the communications unit 16. Thus, when the trigger condition is satisfied, the maintenance operator receives maintenance data and aircraft flight data corresponding to moments which are prior to the moment at which the trigger condition was satisfied. That allows the maintenance operator to better assess how certain data items have evolved prior to the moment, in order to more easily identify a potential fault. In a preferred example embodiment, the processing unit 18 sends at least some of the recorded data before sending the dataset when the trigger condition is satisfied. That allows the various data items to be sent in a chronological order. The memory is managed according to the principle of a circular queue in which the most recent data replaces the oldest data as long as the trigger condition is not satisfied. The size of the memory is determined in such a way that a history of all the data corresponding at least to a desired historical duration can be retained.

In one example embodiment, the processing unit 18 is also configured to receive a send command, originating from the communications unit 16 through the third interface 36. The send command may notably correspond to a send command received from a maintenance operator. Upon receipt of a send command, the processing unit 18 sends the dataset to the communications unit 16 through the third interface 36. That allows a maintenance operator to demand the sending of the maintenance dataset and aircraft flight dataset even when the trigger condition has not been satisfied.

Of course, for better understanding, the exemplary implementations have been described with reference to just one trigger condition whereas in practice, the processing unit 18 may store and monitor several trigger conditions, each of which corresponds for example to the monitoring of one or more fault situations onboard the aircraft.

Furthermore, although the exemplary implementations have been described in the context of the detection of aircraft faults, it is not restricted to this application. It may also in particular be used for monitoring operational events pertaining to the aircraft. These operational events may for example correspond to the opening of a door when the aircraft is stationary on the ground, or alternatively to the detection of specific aircraft flight conditions for which it may be advantageous to transmit the dataset to the ground station.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

We claim:

1. A maintenance aid device to assist with the maintenance of an aircraft including a central maintenance computer, an Aircraft Condition Monitoring System (ACMS), and a communications unit configured to allow communications between the aircraft and a ground station, the maintenance aid device being carried onboard the aircraft, the maintenance aid device being a computer comprising:
   a first communication interface configured to communicate with the central maintenance computer via a first communications link of the aircraft;
   a second communication interface configured to communicate with the ACMS system via a second communications link of the aircraft;
   a third communication interface configured to communicate with the communications unit via a third communications link of the aircraft; and
   a processing system including at least one processor, the processing system being configured to:
      store a trigger condition dependent on at least one aircraft maintenance data item and/or at least one aircraft flight data item;
      acquire first data emanating from the central maintenance computer, through the first communication interface and/or second data emanating from the ACMS system, through the second communication interface;
      verify whether the trigger condition is met, on the basis of the first data and/or of the second data;
      if the trigger condition is met, generate a dataset comprising (i) maintenance data emanating from the central maintenance computer and being contemporaneous with the trigger condition, and (ii) aircraft flight data emanating from the ACMS system and being contemporaneous with the trigger condition, the generated dataset being transmitted to the ground station by the communications unit.

2. The maintenance aid device as claimed in claim 1, wherein the processing system is configured to send the dataset to the communications unit repeatedly.

3. The maintenance aid device as claimed in claim 2, wherein the processing system is configured to repeat the sending of the dataset to the communications unit:
   a predetermined number of times;
   for a predetermined duration; or
   until the processing system receives a stop command to stop the sending, the stop command coming from the communications unit through the third communication interface.

4. The maintenance aid device as claimed in claim 1, wherein the processing system is configured to:
   when the trigger condition is not met, record the dataset in a memory of the device, repeatedly; and
   when the trigger condition is met, send at least some of the data recorded in the memory to the communications unit through the third communication interface.

5. The maintenance aid device as claimed in claim 1, wherein the processing system is configured to receive the trigger condition coming from the communications unit, through the third communication interface.

6. The maintenance aid device as claimed in claim 1, wherein the dataset sent to the communications unit is predefined in connection with the trigger condition.

7. The maintenance aid device as claimed in claim 1, wherein the dataset sent to the communications unit is independent of the trigger condition.

8. The maintenance aid device as claimed in claim 1, wherein the trigger condition corresponds to a combination of at least one elementary condition relating to the at least one aircraft maintenance data item and/or the at least one aircraft flight data item, using at least one logic operator.

9. The maintenance aid device as claimed in claim 1, wherein the processing system is configured to:
   receive a send command, coming from the communications unit, through the third communication interface; and
   upon receipt of a send command, send the dataset to the communications unit, through the third communication interface.

10. The maintenance aid device as claimed in claim 9, wherein the dataset is sent to the communications unit upon receipt of the send command even when the trigger condition is not met.

11. A maintenance aid system to assist with the maintenance of an aircraft, the system being carried onboard the aircraft, the aircraft comprising a communications unit configured to allow communications between the aircraft and a ground station, the maintenance aid system comprising:
   a central maintenance computer;
   an ACMS system; and
   a maintenance aid device to assist with maintenance as claimed in claim 1.

12. The system as claimed in claim 11, wherein the central maintenance computer, the ACMS system and the maintenance aid device are incorporated into one and the same physical unit.

13. An aircraft which comprises a maintenance aid system as claimed in claim 11.

14. A method to assist with the maintenance of an aircraft including a central maintenance computer, ACMS system, a communications unit configured to allow communications between the aircraft and a ground station, and a maintenance aid device, the method comprising:

storing a trigger condition dependent on at least one aircraft maintenance data item and/or at least one aircraft flight data item;

acquiring first data emanating from the central maintenance computer and/or second data emanating from the ACMS system, through the second interface;

verifying whether the trigger condition is met, on the basis of the first data and/or of the second data;

if the trigger condition is met, generating a dataset comprising (i) maintenance data emanating from the central maintenance computer which is contemporaneous with the trigger condition, and (ii) aircraft flight data emanating from the ACMS system which is; contemporaneous with the trigger condition; and transmitting the generated dataset to the ground station by the communications unit.

15. The method as claimed in claim 14, further comprising sending the dataset to the communications unit repeatedly.

16. The method as claimed in claim 15, further comprising repeating the sending of the dataset to the communications unit:

a predetermined number of times;

for a predetermined duration; or until the processing system receives a stop command to stop the sending, the stop command coming from the communications unit.

17. The method as claimed in claim 14, further comprising:

when the trigger condition is not met, recording the dataset in a memory of the maintenance aid device, repeatedly; and when the trigger condition is met, sending at least some of the data recorded in the memory to the communications unit.

18. The method as claimed in claim 14, further comprising:

receiving the trigger condition coming from the communications unit.

19. The method as claimed in claim 14, wherein the dataset sent to the communications unit is predefined in connection with the trigger condition.

20. The method as claimed in claim 14, wherein the dataset sent to the communications unit is independent of the trigger condition.

21. The method as claimed in claim 14, wherein the trigger condition corresponds to a combination of at least one elementary condition relating to the at least one aircraft maintenance data item and/or the at least one aircraft flight data item, using at least one logic operator.

22. The method as claimed in claim 14, further comprising:

receiving a send command, coming from the communications unit; and upon receipt of a send command, sending the dataset to the communications unit.

23. A system to assist with the maintenance of an aircraft, the system comprising:

a central maintenance computer;

an ACMS system;

a communications unit configured to allow communications between the aircraft and a ground station, and a maintenance aid device carried onboard the aircraft, wherein the maintenance aid device is a computer comprising:

a first communication interface configured to communicate with the central maintenance computer by means of a first communications link of the aircraft;

a second communication interface configured to communicate with the ACMS system by means of a second communications link of the aircraft;

a third communication interface configured to communicate with the communications unit by means of a third communications link of the aircraft; and a processing system including at least one processor, the processing system being configured to:

store a trigger condition dependent on at least one aircraft maintenance data item and/or at least one aircraft flight data item;

acquire first data emanating from the central maintenance computer, through the first communication interface and/or second data emanating from the ACMS system, through the second communication interface;

verify whether the trigger condition is met, on the basis of the first data and/or of the second data;

if the trigger condition is met, generate a dataset comprising (i) maintenance data emanating from the central maintenance computer and (ii) aircraft flight data emanating from the ACMS system, the dataset being contemporaneous with the trigger condition; and transmit the generated dataset to the ground station by the communications unit.

* * * * *